United States Patent

Bence

[15] 3,706,578
[45] Dec. 19, 1972

[54] ALL-RAPESEED OIL SHORTENINGS
[72] Inventor: Patrick J. Bence, Hamilton, Ontario, Canada
[73] Assignee: The Procter & Gamble Company, Cincinnati, Ohio
[22] Filed: Sept. 30, 1970
[21] Appl. No.: 77,007

[52] U.S. Cl. .................................................99/118 R
[51] Int. Cl. ................................................A23d 5/00
[58] Field of Search .........................99/118 R, 122 R

[56] References Cited

UNITED STATES PATENTS 3,253,927  5/1966  Going et al. .........................99/118 R

FOREIGN PATENTS OR APPLICATIONS 780,135  7/1957  Great Britain .....................99/122 R
701,316  1/1965  Canada ..............................99/118 R
701,330  1/1965  Canada ..............................99/118 R

OTHER PUBLICATIONS

Tremazi et al., Characterization and Evaluation of Some Rapeseed Oils, .A.O.C.S., Feb. 1965, Vol. 42, No. 2, pp. 78–81.

Primary Examiner—Joseph M. Golian
Attorney—Edmund J. Sease and Richard C. Witte

[57] ABSTRACT

A stable rapeseed oil shortening based on a blend of separately hydrogenated hardstock and softstock. The hardstock has an iodine value within the range of 0 to 20, and the softstock has an iodine value of at least 85. Because the shortening is crystallized in the beta polymorphic phase, it is stable over a wide range of temperatures.

8 Claims, No Drawings

ALL-RAPESEED OIL SHORTENINGS

BACKGROUND OF THE INVENTION

Commercially available shortenings are usually prepared from edible vegetable oils. Shortening preparation is accomplished by refining, bleaching and deodorizing oils or mixtures thereof, hydrogenating the oils to desired iodine values and, in the case of plastic shortenings, subjecting the oils or mixtures thereof to crystallization to provide a product which is approximately 85 percent oil and 15 percent solids at room temperature. However, because the oil is maintained within a matrix of crystals, it appears as though the entire product is solid or plastic in nature. Such plasticized shortenings are usually in a beta prime crystal phase form which heretofore has been thought preferable in providing uniform product stability over varying temperature ranges. Whether a plasticized product is in the form of alpha, beta or beta prime polymorphic crystal phase is dependent upon the particular blend of oils employed, the degree of hydrogenation of the blended oils, and the particular processing utilized to prepare the ultimate plasticized product.

The largest source of oil for preparation of shortenings is at present the seeds of annual plants such as flax, soybean, cottonseed, rapeseed, safflower seed, peanuts, and the like. These annual seed crops are in general products of relatively temperate climates and require more or less careful cultivation. They constitute a flexible portion of the world's oil and fat supplies, and the production of an individual crop may be varied within wide limits from season to season. Because these crops are rather sensitive to climate variations, the quantity of any particular seed plant which is available for processing into shortenings in any given season will vary depending upon whether the growing season was favorable or unfavorable from the standpoint of desirable climatic conditions. In addition to weather, the supply of any given oil is also affected to a certain extent by the availability of imports from certain countries. This is particularly true of oils such as palm oil and coconut oil. Because the availability of oils necessary for the production of shortenings is something the shortening manufacturer has little control over, it is desirable for the shortening manufacturer to have a variety of alternative methods of producing plasticized shortenings. Ideally, these alternatives should include suitable shortenings prepared from a variety of different oils.

Heretofore, it has not been thought possible to prepare a plastic shortening product from 100 percent rapeseed oil primarily because attempts to make such shortenings resulted in plastic shortening products showing poor consistency stability and having a tendency to firm up upon storage at higher temperatures, i.e., 85° to 105° F. Of course, plastic shortenings having poor consistency and having a tendency to become firm upon storage at temperatures to which they are often subjected during packaging and storing are unsuitable as commercial consumer products. Accordingly, heretofore a 100 percent rapeseed oil plastic shortening has not been produced.

It is the object of this invention to produce an all rapeseed oil-derived plastic shortening having uniform consistency and which does not have a tendency to firm up upon storage at elevated temperatures within the range of 85°F to 105°F.

Another object of this invention is to provide a method of preparation of an all-rapeseed oil shortening having the above described stability characteristics.

These and other objects will become apparent from the following detailed description.

DETAILED DESCRIPTION OF THE INVENTION

This invention relates to an all-rapeseed oil plastic shortening. The term "plastic" as used herein is utilized to designate a shortening product which appears to be solid at room temperature. This is to be distinguished from a liquid shortening which is specially processed to prevent formation of crystals and a "plastic" state.

Rapeseed oil, also known as rape oil and colza oil, is obtained mainly from the seeds of plants botanically known as *Brassica campestris*, or napus, which are grown mainly in China, India, Pakistan, Japan, and Canada. The oil, obtained mainly by pressing, is one of the more important oils in the world, and according to *Bailey's Industrial Oil & Fat Products*, 3rd Ed., published by John Wiley & Sons, there is an estimated annual production of over 2½ billion pounds of rapeseed oil. The crude oil is dark yellow or amber; however, after refining, bleaching and deodorizing which are conventional steps involved in the processing of any oil, and which are adequately described in *Bailey* and therefore will not be described herein, rapeseed oil is a pale yellow similar to that of other seed oils.

The exact composition of any specific sample of rapeseed oil will vary to some degree depending upon the source of that oil. However, generally rapeseed oil is recognizable because of its high content of erucic acid, i.e., often within the range of 40 percent to 55 percent by weight of the oil. As will be explained hereinafter, the erucic acid content of the oil forms part of a preferred embodiment of this invention.

The fatty acid composition of some representative rapeseed oils are given in the following Table.

| Analysis | Rapeseed Indian | Rapeseed Indian | Rapeseed Polish | Rapeseed Argentinian | Rapeseed Canadian | Range of Values |
|---|---|---|---|---|---|---|
| Fatty acids | | | | | | |
| Palmitic | 1.9 | 1.9 | 2.8 | 2.6 | 2.5 | 1– |
| Stearic | 3.5 | | 1.2 | 3.0 | 2.6 | 0.4–3.5 |
| arachidic | 0.7 | 2.4 | 0.9 | 0.6 | 0.8 | 0.5–2.4 |
| Behenic | 0.7 | 1.4 | 0.6 | 2.1 | 1.4 | 0.6–2.1 |
| Lignoceric | 0.8 | 0.8 | 0.7 | 0.5 | — | 0.5–1 |
| Total saturated | 7.6 | 9.5 | 6.2 | 6.8 | 7.3 | — |
| Hexadecanoic | 1.5 | 2.6 | 2.9 | 0.6 | 0.2 | 0.2–3 |
| Oleic | 12.3 | 16.3 | 14.2 | 16.0 | 16.3 | 12–24 |
| Eicosenoic | 4.8 | 5.1 | 3.5 | 6.0 | 11.6 | 3.5–11.6 |
| Erucic | 47.8 | 45.0 | 52.5 | 47.3 | 39.7 | 40–55 |
| Linoleic | 15.8 | 13.4 | 12.0 | 12.5 | 15.3 | 12–16 |
| Docosadienoic | 1.5 | 0.9 | 1.1 | | 0.6 | 0.6–2 |
| linolenic | 8.7 | 7.2 | 7.6 | 9.9 | 8.9 | 7–10 |
| Total Unsaturated | 92.4 | 90.5 | 93.8 | 93.2 | 92.6 | — |

In connection with the following description of the product of this invention, it is to be understood that the rapeseed oil which is utilized herein is refined, bleached and deodorized rapeseed oil. As previously mentioned, refining, bleaching and deodorizing are well known processes, and will not be described herein. Specific reference to such treatments is found in texts such as *Bailey*.

The term "iodine value," often seen as I.V., is well known in oil technology and refers to the amount of iodine that will add to the unsaturated bonding of a 100 gram sample of any oil. The higher the I.V. the higher the degree of unsaturation, and conversely, the lower the I.V. the lower the degree of unsaturation.

The all-rapeseed oil-derived plastic shortening of this invention comprises a blend of two separately hardened components. The first component is rapeseed oil which has been hardened, i.e., hydrogenated, to nearly complete saturation, and this component is referred to as a hardstock component. The hardstock component must have an iodine value within the range of from 0 to 20, and preferably within the range of from 1 to 5. If the hardstock component has an iodine value above about 20, the hardstock will have a high proportion of intermediate melting solids, i.e., those which melt between 70°F and 90°F, and this will inhibit transformation during plasticization to the stable and therefore desirable beta polymorphic phase. Shortening polymorphic phases and the differing properties of different crystal phases will hereinafter be explained in more detail.

Hydrogenation of the unsaturated acids present in rapeseed oil to provide rapeseed oil hardstock having an iodine value within the range of from 0 to 20 and within the preferred range of 1 to 5 is accomplished by known processes and is generally conducted in the presence of a suitable catalyst such as nickel, platinum, or palladium. In the presence of such catalysts, preferably in finely divided state, gaseous hydrogen adds readily to the double bonds of unsaturated fatty acids, transforming them to the corresponding saturated acids or reducing their degree of unsaturation. For further detail of catalytic hydrogenation, see *Bailey Industrial Fats and Oils*, Chapter 17.

The second component of the plastic all-rapeseed oil shortening of this invention comprises a rapeseed oil softstock which is hydrogenated to an iodine value of at least 85 and preferably to a value within the range of from 85 to 105, and most preferably from 87 to 95. The term "softstock" as used herein is utilized to designate that portion of the two-component blend which has the highest degree of unsaturation, i.e., the highest I.V. number. If the softstock component has an I.V. of less than about 85, it will be too high in intermediate melting solids and, as previously mentioned in regard to the hardstock component, will inhibit transformation to the desirable and stable beta polymorphic phase.

The hardstock component and the softstock component are blended such that the hardstock comprises from 10 percent to 20 percent by weight of the all-rapeseed oil plastic shortening and preferably from 12 percent to 16 percent by weight of the shortening. Correspondingly, the softstock portion comprises from 80 percent to 90 percent by weight, and preferably from 84 percent to 88 percent by weight of the shortening.

As will be explained in more detail hereinafter, while beta phase shortenings are thermodynamically stable they have not often been employed because they appear nonuniform in consistency, i.e., soupy, and because they are translucent which gives an undesirable consumer reaction. Employing the previously described percentage limits of the hardstock and softstock components provides a predominantly beta phase shortening which surprisingly is of uniform consistency of a more nearly opaque appearance and which does not firm up at slightly elevated temperatures.

To further induce beta crystallization, the erucic acid content of the blended shortening should preferably range from 20 percent to 36 percent by weight of the shortening and most preferably from 24 percent to 28 percent by weight of the shortening. Controlling the erucic acid content to within these specified preferred ranges is done by insuring that the softstock and hardstock components prior to blending have their respective required iodine values.

As previously mentioned, an important characteristic of any plastic shortening composition is the crystalline structure of the solid portion of that shortening composition. For often the crystal structure is determinative of such physical characteristics as firmness and stability. Conventionally, partially hydrogenated shortenings have a dominant beta prime crystalline phase as distinguished from an alpha- or beta phase. These types of polymorphic crystalline structures of fats can be identified by their X-ray diffraction patterns, and are described in U.S. Pat. Nos. 2,521,241–2. Many of the ordinary glyceride oils, including rapeseed oil, can be crystallized in one or more of these forms depending upon the particular processing to which the oil is subjected.

Conventional plastic shortenings containing solid triglycerides in the beta prime crystalline form are noticeably deficient in their ability to withstand storage at temperatures in the order of 90°F for periods of 30 days or so without appreciable change in their plasticity characteristics. Some types of beta prime plastic shortenings tend to stiffen or firm excessively and thus become difficult to blend with other constituents in normal food recipes. Still other types of beta prime plastic shortenings tend to become less firm and even soften to a pourable consistency and thereby lose certain desirable characteristics.

Although the beta phase crystalline form of triglyceride is known to be a more thermodynamically stable crystalline phase than the beta prime phase, it has not been general practice to employ shortenings with the solid phase predominantly in the beta crystalline form rather than in the beta prime form because beta phase crystalline form shortenings tend to have a soupy, highly fluid consistency and a translucent appearance.

Surprisingly as earlier mentioned, the all-rapeseed plastic shortenings of this invention having the above-described formulation are predominantly beta in crystal structure and yet are not of a soupy highly fluid consistency or translucent in appearance but rather are stable, of uniform solid consistency, more opaque in appearance, and do not "firm up," i.e., become stiff and difficult to blend with other foods at temperatures of from 70°F to 105°F, as one would expect from an all-rapeseed shortening.

To summarize briefly, the all-rapeseed oil-derived plastic shortening of this invention comprise from 10 percent to 20 percent and preferably from 12 percent to 16 percent of a hardstock which has an iodine value of from 0 to 20, and preferably of from 1 to 5. The rapeseed softstock component comprises from 80 percent to 90 percent by weight of the all-rapeseed shortening and preferably from 84 percent to 88 percent by weight of the shortening, and has an I.V. of at least 85 and preferably from 85 to 105, and most preferably of from 87 to 95. Preferably, the shortening should have an erucic acid content of from 20 percent to 36 percent by weight of the total shortening, and most preferably from 24 percent to 28 percent by weight of the total shortening. Finally, the plastic shortening is crystallized predominantly in the beta polymorphic crystalline and therefore is thermodynamically stable as one would expect of a beta shortening; surprisingly, none of the usual disadvantages of beta shortenings are exhibited by the all-rapeseed shortening of this invention.

If desired, the product may contain small percentages of known emulsifiers such as mono- and diglycerides, propylene glycol monoesters, fatty acid esters, and the like. Such emulsifiers where added should be from 0.5 percent to 10 percent by weight of the total shortening. Such emulsifiers can be effective as modifying certain of the properties of the all-rapeseed shortening. The emulsifier, as mentioned above, is added and considered as "extra" over and above the all-rapeseed shortening which is comprised only of the specified percentages of hard-stock and softstock.

As previously mentioned, this invention also relates to a method of preparing the previously described all-rapeseed plastic shortening. A preferred method of forming the predominantly beta phase all-rapeseed plastic shortenings of this invention comprises forming a completely melted mixture of the hardstock and softstock each in the above described proportions. This can usually be accomplished by heating to a temperature in excess of about 150°F. The melted oil mixture is then pumped into a freezer which is usually a scraped wall heat exchanger in which the oil is rapidly chilled to a temperature of from 40°F to 50°F. A suitable device for this purpose is referred to as a freezer or Votator, and is described in U.S. Reissue Pat. No. 21,406.

Generally, the entering temperature to the chilling unit, i.e., freezer or Votator, is from 100°F to 200°F, and preferably from 140°F to 160°F. A preferred residence time in the freezer or Votator is from about 10 seconds to 90 seconds and, most preferably, from 12 seconds to 20 seconds.

The chilling step causes the mixture to be nucleated with minute fat crystals in the beta polymorphic crystalline phase. The chilled partially crystallized all-rapeseed blend is then passed into a picker box where crystallization of the rapeseed oil is permitted to continue with mild agitation. The residence time in the picker box mixer should be as short as possible, and preferably about ½ minute to 1½ minutes. The entering temperature with respect to the picker is preferably within the range of 45°F to 100°F, and most preferably within the range of from 50°F to 80°F.

The "picking step" (often referred to as agitating to induce further crystallization) during which the all-rapeseed oil plastic shortening of this invention is solidified into a predominantly beta polymorphic crystal state can be accomplished in an apparatus referred to as an in-line or pipeline agitator comprising an outer cylindrical shaped shell of 4-inch to 30-inch diameter, and an 8-inch to 60-inch length, and a rotatable shaft mounted internally along the axis of the shell. Turbine blades, generally of a flat radial discharge style, are mounted on the shaft. The turbine blades have diameters ranging from about 2 inches to about 12 inches. The shaft is rotated at a very high rate of speed, e.g., from about 1,500 to 4,000 rpm, and this causes the partially crystallized rapeseed oil fed into one end of the mixer to pass through the turbines and be subjected to a high degree of turbulence and agitation.

After picking, the all-rapeseed oil plastic shortening can be packaged and allowed to complete the final stages of crystallization under proper tempering conditions. For example, it can be tempered by allowing it to set for from about 12 to about 168 hours at a temperature within the range of about 70°F to 90°F whereby a highly desirable uniform consistency stable all-rapeseed plastic shortening in predominantly the beta phase is formed.

The process of this invention is illustrated but not limited by the following examples.

EXAMPLE 1

A 125-pound sample of Canadian rapeseed oil was obtained. The oil was refined, bleached, and deodorized in accord with the known methods of refining, bleaching, and deodorizing described in *Baileys's Industrial Fats and Oils* which has previously been incorporated herein by reference. 15 percent (18.75 pounds) of the rapeseed oil was hydrogenated (by nickel catalytic hydrogenation) to an iodine value of 3. This portion comprised the hardstock component. The remaining 85 percent portion (106.25 pounds) of the rapeseed oil was hydrogenated by nickel catalytic hydrogenation to an iodine value of 89.

In both instances, hydrogenation was accomplished by placing the charge of rapeseed oil in a batch vessel and heating that vessel to a temperature of approximately 150°F and holding the heated oil under a vacuum of about 24 inches of mercury to deaerate and dry the oil. Thereafter finely divided nickel catalyst is added to the oil in slurry form, and heating is continued by utilizing a steam heating coil at temperatures within the ranges of 270°–300°F; simultaneously the oil is continuously sparged with hydrogen until refractive index readings indicate reaching the desired iodine value. Thereafter the hydrogenated oil is cooled and filtered.

The melted hardstock component having an iodine value of 3 is blended with the melted softstock component having an iodine value of 89. The temperature of the melted mixture is approximately 160°F. The melted blended oil mixture was thereafter pumped into a scraped wall heat exchanger in which the oil was rapidly chilled to a temperature of 50°F. The residence time within the scraped wall heat exchanger, which is known as a Votator, was 18 seconds.

The above described chilling step caused the oil blend to be nucleated with minute fat crystals in the beta polymorphic phase. The chilled partially crystallized all-rapeseed blend was then passed into a picker box wherein crystallization was allowed to continue with mild agitation. The residence time in the picker box mixer was 40 seconds, and the entering temperature was 50°F.

The above referred to "picking step" was accomplished in an apparatus known as an in-line agitator which comprised an outer cylindrical shaped shell having a rotatable shaft mounted internally along the axis of the shell. Turbine blades of a flat radial discharge style were mounted on the shaft and had a diameter of 4 inches. The shaft rotated at a speed of 3,000 rpm, which caused the partially crystallized rapeseed oil fed into the mixer to pass through the turbines and be subjected to a high degree of turbulence and agitation.

After picking, the all-rapeseed, now plastic shortening which was crystallized predominantly in the beta phase, was allowed to complete crystallization under tempering conditions by allowing it to set for 6 days at 85°F. The product was observed to be a highly desirable uniform consistency all-rapeseed shortening predominantly crystallized in the beta phase and yet was not translucent or soupy and did not firm up when heated to 100°F. Analysis showed the erucic acid content to be 25 percent.

EXAMPLE 2

Example 1 was repeated utilizing a 125-pound portion of Canadian rapeseed oil which was separated into a hardstock component having an iodine value of 3 which comprised 16 percent by weight of the total oil, and a softstock component having an iodine value of 88 which comprised 84 percent by weight of the total rapeseed oil. Analysis of the product revealed that 82 percent of the product was crystallized in the beta phase, and the product had an erucic acid content of 26 percent. The product was opaque in appearance and of uniform consistency.

What is claimed is:

1. A stable, all-rapeseed oil plastic shortening, crystallized predominantly in the beta polymorphic phase, comprising a blend of separately hydrogenated rapeseed oil hardstock having an iodine value within the range of from 0 to 20 and rapeseed oil softstock having an iodine value of at least 85, said hardstock component comprising from 10 percent to 20 percent by weight of said blend and said softstock component comprising from 80 percent to 90 percent by weight of said blend, and said shortening having an erucic acid content of from 20 percent to 36 percent by weight of the shortening.

2. The all-rapeseed oil shortening of claim 1 wherein the softstock component iodine value is within the range of from 85 to 105.

3. The all-rapeseed oil shortening of claim 2 wherein the softstock component iodine value is within the range of from 87 to 95.

4. The all-rapeseed oil shortening of claim 1 wherein the erucic acid content is from 24% to 28% by weight of the shortening.

5. The all-rapeseed oil shortening of claim 1 wherein the softstock component comprises from 84% to 88% by weight of the all-rapeseed oil shortening.

6. The all-rapeseed oil shortening of claim 1 wherein the hardstock component comprises from 12 percent to 16 percent by weight of the shortening.

7. The all-rapeseed oil shortening of claim 1 wherein the softstock component has an iodine value of from 87 to 95, and comprises from 84 percent to 88 percent by weight of said shortening, and wherein the hardstock component has an iodine value of from 1 to 5 and comprises from 12 percent to 16 percent by weight of said shortening.

8. A method of forming an all-rapeseed oil plastic shortening which comprises blending at a temperature in excess of 150°F a mixture comprising from 10 percent to 20 percent by weight of an all-rapeseed hardstock component having an iodine value of from 0 to 20, and from 80 percent to 90 percent of said mixture comprising a soft-stock component having an iodine value of at least 85; chilling the blended mixture to a temperature of from 40°F to 59°F whereby the mixture is nucleated with minute fat crystals in the beta polymorphic crystalline phase; agitating the nucleated chilled mixture to induce further crystallization; and tempering the all-rapeseed shortening for from 12 to 168 hours at a temperature within the range of from 70°F to 90°F to form a desirable, uniform consistency, stable, all-rapeseed plastic shortening which is predominantly of the beta crystalline phase.

* * * * *

FO-1050
(5/69)

UNITED STATES PATENT OFFICE
CERTIFICATE OF CORRECTION

Patent No. 3,706,578      Dated December 19, 1972

Inventor(s) Patrick J. Bence

It is certified that error appears in the above-identified patent and that said Letters Patent are hereby corrected as shown below:

Col. 2 - in the Table, lines 44 through 66 - there are 4 errors which are listed below:

Under the Analysis Column:

"Palmitic" under column "Range of Values" "1- " should read -- 1-3 --.

"Stearic" under column "Rapeseed Indian" instead of the "blank" it should read -- 3.0 --.

"Stearic" under column "Rapeseed Argentinian" the "3.0" should read -- 1.0 --.

"Docosadienoic" under column "Rapeseed Argentinian" the "blank" should read -- 0.9 --.

Col. 6 - line 51

The word "ranges" should read -- range --.

Col. 8 - line 36

The temperature "59°F" should read -- 50°F --.

Signed and sealed this 12th day of June 1973.

(SEAL)
Attest:

EDWARD M. FLETCHER, JR.           ROBERT GOTTSCHALK
Attesting Officer                       Commissioner of Patents